United States Patent [19]

Parks et al.

[11] Patent Number: 5,791,551
[45] Date of Patent: Aug. 11, 1998

[54] VACUUM INSULATION VESSELS AND METHODS OF MAKING SAME

[75] Inventors: Jerry M. Parks, Johnstown; Herbert L. Hall, Jr., Newark; Stanley J. Rusek, Jr., Granville, all of Ohio

[73] Assignee: Owens Corning Fiberglas Technology, Inc., Summit, Ill.

[21] Appl. No.: 685,722

[22] Filed: Jul. 24, 1996

[51] Int. Cl.⁶ .................. B23K 31/02; B23K 35/28
[52] U.S. Cl. ............... 228/184; 228/173.1; 228/246
[58] Field of Search ................... 228/173.1, 184, 228/221, 246, 248.1, 56.3; 29/455.1

[56] References Cited

U.S. PATENT DOCUMENTS

| | | |
|---|---|---|
| 2,024,065 | 12/1935 | Schellens . |
| 3,457,630 | 7/1969 | Schwartz et al. . |
| 4,029,476 | 6/1977 | Knopp . |
| 4,157,779 | 6/1979 | Ishii et al. . |
| 4,212,669 | 7/1980 | Veeck et al. . |
| 4,455,354 | 6/1984 | Dillon et al. ............... 428/568 |
| 5,108,025 | 4/1992 | Kang et al. . |
| 5,153,977 | 10/1992 | Toida et al. . |
| 5,156,321 | 10/1992 | Liburdi et al. . |
| 5,242,097 | 9/1993 | Socha ............... 228/56.3 |
| 5,426,343 | 6/1995 | Rhodes et al. . |
| 5,427,865 | 6/1995 | Mullen, III et al. . |
| 5,500,305 | 3/1996 | Bridges et al. . |
| 5,573,140 | 11/1996 | Satomi et al. ............... 220/420 |
| 5,588,197 | 12/1996 | Satomi et al. ............... 220/420 |
| 5,620,129 | 4/1997 | Rogren ............... 228/56.3 |

OTHER PUBLICATIONS

Alloys Unlimited, Inc. "A Guide To Preform Soldering", 1959, p. 2.
Protective Metal Alloys brochure entitled "Nickel & Cobalt Powder Metallurgy Preforms".

*Primary Examiner*—Samuel M. Heinrich
*Attorney, Agent, or Firm*—C. Michael Gegenheimer; Curtis B. Brueske

[57] ABSTRACT

The present invention involves the use of a braze preform (28) for sealing and maintaining a vacuum in an insulation vessel (10). The braze preform (28) comprises particles of a braze material that are at least partially sintered together and at least substantially free of a binder. An assembly is provided for use in a method of manufacturing a vacuum insulation vessel (10). The assembly comprises a metal jacket (12) defining an interior space (20) to be evacuated and one or more evacuation ports (24) formed through a wall of the jacket (12). The evacuation ports (24) provide an opening to the interior space (20). The sintered braze preform (28) is located adjacent to the evacuation ports (24) so as to seal the evacuation ports (24) upon the melting of the brazing material. After the interior space (20) of the jacket (12) is evacuated, the preform (28) can be melted and allowed to solidify and seal the evacuation ports (24). In this way a vacuum can be maintained in the interior space (20).

10 Claims, 4 Drawing Sheets

VACUUM INSULATION VESSELS AND METHODS OF MAKING SAME

BACKGROUND AND SUMMARY OF THE INVENTION

The present invention is related to vacuum insulation vessels, more particularly, to vacuum insulation vessels hermetically sealed with a brazing material and, even more particularly, to metal-jacketed vacuum insulation vessels hermetically sealed with a braze preform of sintered brazing metal or metal alloy particles.

Vacuum insulation vessels such as, for example, the dewar type or flat panel type typically include a metal jacket defining an interior space which is evacuated. During the manufacturing of such vessels, the metal jacket is usually heated while its interior space is being evacuated. Depending on the insulating requirements of the particular application, an insulation medium (e.g., compressed glass fiber wool) may be provided in the vessel's interior space. Vessels that do not contain an insulation medium are typically heated to relatively high temperatures during the evacuation process. Vessels that contain an insulation medium usually cannot be evacuated at such high temperatures without damaging the insulation medium.

One way of manufacturing a vacuum insulation vessel is disclosed in U.S. Pat. No. 5,153,977. The U.S. Pat. No. 5,153,977 discloses a dewar type vessel having some type of depression formed in the outer wall of its jacket and one or more evacuation openings formed through the outer jacket wall at the bottom of the depression. A vacuum is formed in the vessel by evacuating the interior space of the jacket through the evacuation openings. Once the vessel is sufficiently evacuated, a paste of powdered brazing material is melted so as to fill and hermetically seal the evacuation openings and, thereby, the vessel. The braze paste is usually positioned in the depression adjacent to the evacuation ports before the vessel is evacuated. The braze paste typically includes some form of organic binder for keeping the brazing powder together until the sealing step.

While such a braze paste can be used to effectively seal and maintain the vacuum in a vacuum insulation vessel, the prior art use of braze paste suffers from several serious drawbacks. The most serious of these is the unacceptable losses that can be experienced due to poor quality or otherwise unacceptable seals made using a braze paste. High throughput losses of up to 50% have been known to occur during the manufacture of vessels using a braze paste.

Therefore, there is a need for a more reliable way to braze seal evacuated vacuum insulation vessels.

In one aspect of the present invention, this need is satisfied by providing a braze preform for sealing and maintaining a vacuum in an insulation vessel, in accordance with the principles of the present invention. The present braze preform is meltable and comprises a powder, or other particles, of a braze material that are sintered, or at least partially sintered. The present sintered braze preform can be substantially free, if not completely free, of a binder. The present braze preform can be formed using conventional sintering techniques. It is desirable for the braze preform to be formed by sintering binderless powder or other particles of a suitable brazing material such as, for example, a nickel, copper, or silver bearing brazing alloy. It may be desirable for the braze preform to be formed using supersolidus liquid phase sintering. It may also be desirable for the braze preform to be made using gravity molding techniques.

In order to provide a sufficient path for the evacuation of the insulation vessel before the sealing operation, it may be desirable for the braze preform to include one or more stand-off protuberances which are integrally or otherwise formed thereon.

The present braze preform can be formed into a variety of shapes and sizes in order to facilitate the sealing process. For example, the braze preform can be disk-shaped or plate-shaped, with a uniform thickness or a non-uniform thickness (e.g., a spherical segment shape) The present braze preform can also have an outer peripheral edge with one or more non-circular or otherwise non-curved portions. Because of its sintered structure, the present braze preform is relatively robust and strong. Its strength and robust nature enables the present braze preform to better survive the handling typically associated with manufacturing, including sealing, of a vacuum insulation vessel. Its strength and robust performance also allows thinner and lighter braze preforms to be employed. It is believed that the present sintered braze preforms can be as thin as about 0.030 inches (0.076 cm) and weigh as little as 0.5 grams and still perform satisfactorily.

When braze paste has been employed, it has often been applied to the vacuum insulation vessel at different locations and in different amounts, even for the exact same vessel. It has been discovered that this variability can result in an increase in the incidence of incomplete or inadequate braze seals. Even if the braze paste is preformed into a desired shape, such as a ring, simple handling can alter the appearance of the preformed braze paste and introduce inconsistent results in the sealing operation. Using a sintered braze preform, as taught herein, can substantially reduce this inconsistency and result in a more reliable manufacturing process and consistently higher throughputs.

It has also been found that, during the sealing operation or whenever heated, typical braze pastes give off or evaporate volatiles which can contaminate the vacuum system and/or adversely affect the integrity of the final braze seal. Because they are sintered, the present braze preforms can substantially reduce this problem.

It has further been found that the failure of braze seals made from braze paste typically fall into one or more of the following categories: preform eruption, poor wet-out, permeability and/or excessive drainage. Preform eruption refers to the inability of the preform to withstand damage due to escaping trapped gases and/or volatilized organics. Poor wet-out refers to the evacuation ports being incompletely filled. Permeability refers to porosity in the braze seal which causes the vessel to lose its vacuum. Excessive drainage refers to excessive amounts of the molten braze material draining through the evacuation ports and leaving some ports uncovered. Using a sintered braze preform, in accordance with the principles of the present invention, can eliminate or significantly reduce the impact of these problems.

In another aspect of the present invention, an assembly is provided for use in manufacturing a vacuum insulation vessel, according to the principles of the present invention. The assembly comprises a metal jacket defining an interior space to be evacuated and one or more evacuation ports formed through a wall of the jacket. The evacuation ports provide an opening to the interior space. The above described sintered braze preform is located adjacent to the evacuation ports so as to seal the evacuation ports upon the melting of the brazing material. After the interior space of the jacket is evacuated, the preform can be melted and allowed to solidify and seal the evacuation ports. In this way, a vacuum can be maintained in the interior space.

The metal jacket can contain an insulation medium (e.g., glass wool, compressed glass fibers or other fibrous insulation structures) in its interior space. In some applications, it is desirable for the insulation medium to have a density sufficient to oppose the atmospheric force on the jacket after the interior space is evacuated. A portion of the metal jacket can be in the form of a receptacle (e.g., a concave dimple), with the evacuation ports located in the receptacle and the preform disposed in the receptacle.

In a further aspect of the present invention, this need is satisfied by providing a method for manufacturing a vacuum insulation vessel (e.g., a vacuum insulation panel, a dewar type vacuum insulation vessel, a vacuum bottle, etc.) which is sealed using one or more of the present sintered braze preforms. The present method includes the step of forming a metal jacket defining an interior space to be evacuated, which can have one or more evacuation ports formed through a wall thereof which provides an opening to the interior space. At least one sintered braze preform may be located adjacent to the one or more evacuation ports. After the interior space of the jacket is evacuated, each braze preform can be at least partially melted and then allowed to solidify so as to seal each evacuation port and maintain a vacuum in the interior space.

If supersolidus liquid phase sintering and gravity molding are used to form the braze preform, it is desirable for the particles of the brazing material to be a binderless brazing alloy. It is also desirable for the sintering to take place in a vacuum or inert gas filled furnace.

During the step of forming the metal jacket, it may be desirable for a receptacle to be formed in a portion of the jacket so that the evacuation ports are formed in the receptacle. The braze preform can then be disposed in the receptacle. At least one of the receptacle and the braze preform can be operatively adapted so as to allow the evacuation of the interior space through the evacuation port to progress substantially unimpeded. It may be desirable for one or both of the receptacle and the braze preform to also be operatively adapted so that the preform remains in the receptacle before and during the step of melting the preform.

Depending on its configuration, it may be desirable for the braze preform to be maintained a sufficient distance above the one or more evacuation ports to provide a suitable path for the evacuation of the interior space. This spacing can be obtained by providing the braze preform with one or more stand-off protuberances (e.g., two or more legs, dimples, nodes, etc.) which maintain the body of the braze preform that distance above the evacuation ports. In the alternative or in addition, the receptacle can be formed with one or more projections which support the body of the braze preform that distance above the evacuation ports.

The receptacle and the braze preform can also be operatively adapted so as to allow the evacuation of the interior space to progress substantially unimpeded by forming the receptacle with an opening having a first shape and providing the braze preform with an outer peripheral edge having a second shape. The first shape and the second shape may be sufficiently different to provide at least one gap therebetween which provides a path for the evacuation of the interior space through the evacuation port when the preform is disposed in the receptacle.

Because it is sintered, the present braze preform may be melted, during the sealing of the vacuum insulation vessel by applying a timed-cycle of heat to the braze preform.

The objectives, features, and advantages of the present invention will become apparent upon consideration of the detailed description and the appended drawings.

DETAILED DESCRIPTION

Although the present invention is herein described in terms of specific embodiment, it will be readily apparent to those skilled in this art that various modifications, re-arrangements, and substitutions can be made without departing from the spirit of the invention. The scope of the present invention is thus only limited by the claims appended hereto.

While the present invention is not limited to the manufacture of a particular type of vacuum insulation vessel 10, for the purposes of this description the vessel 10 is a vacuum insulation panel having an outer skin or jacket 12. Since the vessels 10 disclosed herein include many components which are substantially identical or at least similar, such components are indicated by the same numerals and are not explained repeatedly herein. The jacket 12 includes an upper wall 14 and a lower wall 16 which are joined along a circumferential seam 18 using conventional techniques. The jacket 12 is made of a suitable metal material such as, for example, 0.003 inch thick 304L stainless steel foil. Nickel based alloy foils (e.g., an Inconel) and other suitable metal foils may also be used for the jacket 12. The jacket 12 defines an interior space 20. An insulation medium 22 is disposed in the interior space 20.

The insulation medium 22 may be in the form of, for example, a dense or compressed glass fiber wool, such as that manufactured by Owens Corning of Toledo, Ohio having a density in the range of 9.0 to 20.0 pounds per cubic foot. The insulation medium may also be any other fibrous or particulate insulation structure suitable for the particular type of vacuum insulation vessel being manufactured. It is desirable for the insulation medium to have a sufficient density or structure to oppose atmospheric pressures tending to collapse the jacket 12 after the panel 10 is evacuated. The interior space 20 of some types of vacuum insulation vessels 10 (e.g. of some dewar or vacuum bottle type vessels) does not always contain an insulation medium 22. An example of a dewar or vacuum bottle type vessel 10 is disclosed in U.S. Pat. No. 5,153,977 which is incorporated herein by reference in its entirety. The present invention is intended to be applicable to vacuum insulation vessels with or without an insulation medium.

A getter system (not shown) is typically included in the interior space 20 of the jacket 12. An example of such a getter is the type ST301 manufactured by SAES GETTERS, of Colorado Springs, Colo. Another suitable getter system is the type 5A manufactured by SAES GETTERS which employs a molecular sieve in conjunction with palladium oxide. Once activated, such getters will absorb most residual gases (i.e., $H_2$, $O_2$, $N_2$) and water vapor to maintain the vacuum in the panel 10 throughout an extended life. The Type 5A getter system is well suited for manufacturing cycles which include a pre-baking step at atmospheric pressure. At temperatures achieved during the pre-bake, the molecular sieve expels any water it may have absorbed during the assembly process.

In order to create a vacuum in the panel 10, one or more evacuation orifices or ports 24 are formed through the upper wall 14 of the jacket 12. These ports 24 provide the only opening for fluid communication between the interior space 20 and the atmosphere surrounding the panel 10. The evacuation ports 24 are formed at the bottom of a dimple or receptacle 26 formed in the upper wall 14. The evacuation ports 24 can be in the form of one or more circular holes, slits, or otherwise non-circular holes. The evacuation ports 24 can be formed using conventional perforating techniques such as, for example, die punching or laser cutting or drilling techniques. The evacuation ports 24 and the dimple 26 may be formed simultaneously or sequentially using conventional sheet or foil metal forming techniques. The evacuation ports 24 can be situated in a variety of patterns. As is discussed in greater detail below, the interior space 20 of the jacket 12 is evacuated through the openings 24.

Once the interior surface 20 is sufficiently evacuated, the jacket 12 is hermetically sealed using a preform 28 of sintered particles of brazing material. The braze preform 28 is positioned so as to seal the evacuation ports 24 when the brazing material is melted and allowed to solidify. The adequacy of this seal will determine whether a vacuum is maintained in the interior space 20 of the vessel 10. The effective opening (i.e., open area) provided by the evacuation ports 24 is large enough to allow the timely evacuation of the interior space 20. At the same time, each individual port 24 is small enough to be sealed by the molten brazing material of the preform 28 without excessive drainage of the molten brazing material through the ports 24. For very large vacuum insulation vessels 10, numerous evacuation ports 24 may be required to provide the open area needed to keep the evacuation dwell time constant. For vacuum insulation panels 10 having an interior space 20 displacing less than 1,500 $in^3$ (24,581 $cm^3$) and containing a compressed glass fiber wool insulation medium 22, satisfactory results have been obtained with evacuation ports 24 having a total open area of about 0.049 $in^2$ (0.317 $cm^2$). An exemplary process for evacuating and sealing a vacuum insulation vessel 10, according to the present invention, is described in detail below.

It is desirable to dispose a wire mesh or screen (not shown) in the vessel 10 between the insulation medium 22 and the upper wall 14, directly under the evacuation ports 24. If desired, the wire mesh can be tack welded or otherwise secured to the underside of the upper wall 14. The wire mesh can also be simply pressed between the insulation medium 22 and the wall 14. Such a wire mesh will help to prevent, or at least limit, excessive drainage of molten braze material through the evacuation ports 24. In addition, the wire mesh acts as a radiation barrier and helps prevent overheating of the insulation medium during melting of the braze material. Satisfactory results have been obtained with a 3 inch (7.62 cm) square patch of standard woven wire mesh made from 0.0132 inch (0.0335 cm) diameter 304 stainless steel wire. This exemplary patch had a 40 by 40 wire mesh. That is, it had a wire density of about 40 wires/inch (15.75 wires/cm) in each direction.

The receptacle 26 and/or the braze preform 28 are operatively adapted so as to allow the evacuation of the interior space 20 to progress substantially unimpeded through the evacuation ports 24. It is also desirable for the receptacle 26 and the preform 28 to be operatively adapted so that the preform 28 is less likely to become dislodged from its original position in the receptacle 26 during subsequent processing of the vessel 10. At the same time, it is desirable for the braze preform 28 to be easily placed into the receptacle 26 either manually or automatically.

In the past, instead of a preform comprising sintered particles of brazing material, a paste of brazing material was used. This paste contained powdered brazing material bound together by an organic binder. As discussed above, there are many problems associated with using such a brazing paste. While not the most desired embodiment, a sintered preform 28 made from such a brazing paste has been found to be an improvement over simply using the brazing paste, directly, to seal the evacuation ports 24. A conventional brazing paste can be formed into a sintered preform by placing the brazing paste into a mold cavity of a desired configuration and baking the brazing paste at a temperature and for a time sufficient to burn off a substantial amount, if not all, of the organic binder and at least partially sinter the remaining particles of brazing material. Instead of using a mold, it may be desirable to simply form the brazing paste into a desired configuration and then bake out the organic binder. In order to increase the amount of sintering (i.e., diffusion) between the particles of brazing material, it may be desirable to apply pressure to the brazing paste during the baking step.

It has been found more desirable to form the present braze preforms 28 by sintering binderless particles (e.g. powder, etc.) of brazing material. Conventional sintering techniques and equipment can be used to form a preform 28 of binderless brazing particles. An exemplary process for sintering binderless particles of brazing material into a preform 28, according to the present invention, is described in detail further hereinbelow. Satisfactory results can be obtained with a disk-shaped braze preform 28 having a uniform thickness of about 0.060 inches (0.152 cm) and a diameter of about 0.875 inches (2.22 cm).

Figure 1:
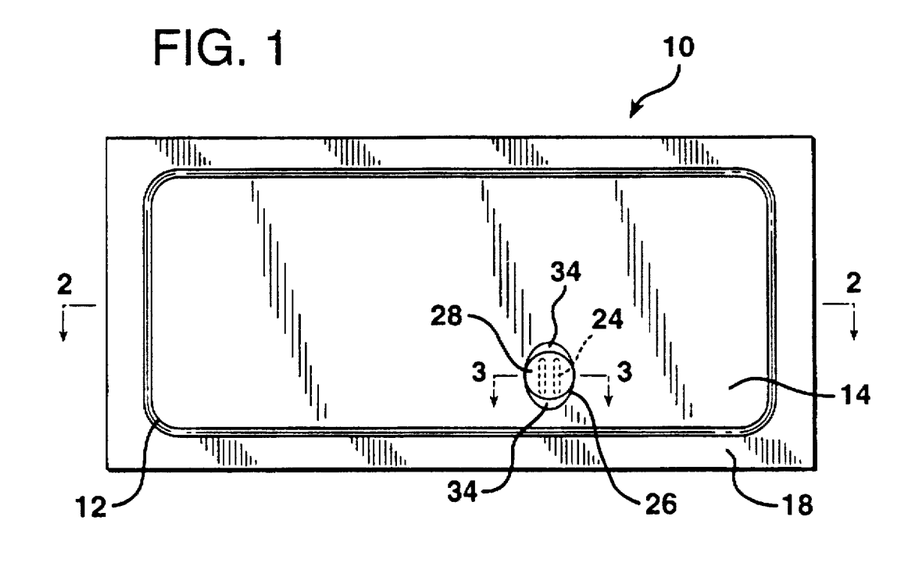
FIG. 1 is a top view of an assembly for manufacturing a vacuum insulation vessel according to one embodiment of the present invention.
Figure 2:
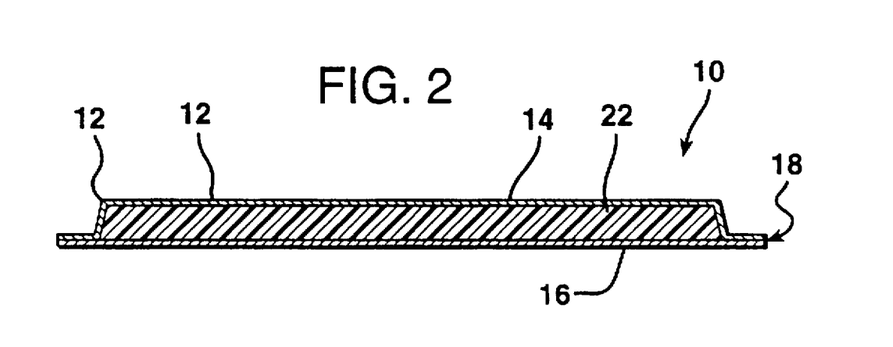
FIG. 2 is a sectional view of the assembly of FIG. 1, taken along line 2—2.
Figure 3:
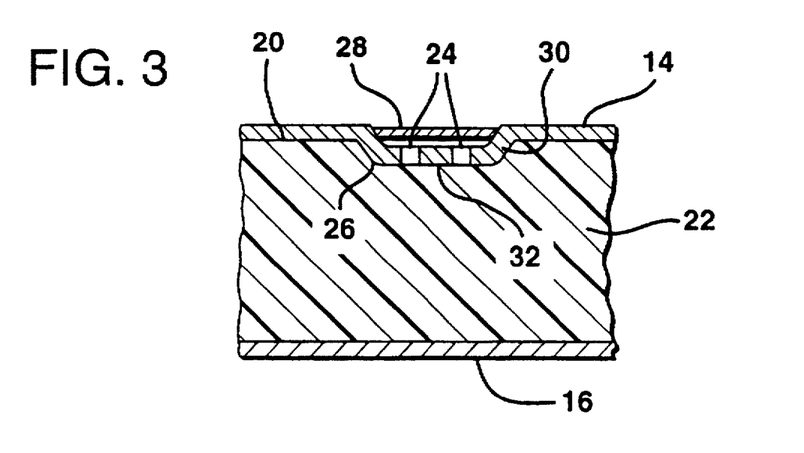
FIG. 3 is an enlarged sectional view of the receptacle area of the assembly of FIG. 1, taken along line 3—3.

In the panel embodiment of the vacuum insulation vessel 10 shown in FIGS. 1-3, the receptacle 26 is a depression having an oblong or oval shape, with a major axis and a minor axis generally parallel to the top surface of the upper wall 14. The depression 26 of FIG. 1 has a side wall 30 which tapers inward toward a bottom wall 32 of the depression 26 (See FIG. 3). The evacuation ports 24 are in the form of two slits or slots. The braze preform 28 of FIG. 1 is disk-shaped with a uniform thickness and a diameter which enables the circular preform 28 to be wedged in the depression 26 a desired distance above the evacuation slots 24.

Satisfactory results can be obtained by locating the preform 28 a distance above the receptacle bottom 32 a distance in the range of from about 0.060 inches to about 0.080 inches (0.152 cm–0.203 cm). Because one is oblong and the other is circular, a gap 34 is formed between the receptacle 26 and the preform 28 at either end of the receptacle 26. In this way, a path for the evacuation of the interior space 20 is defined by the evacuation ports 24, the separation between the preform 28 and the receptacle bottom 32, and the two gaps 34 at either end of the receptacle 26. Instead of being in the form of two slots or slits, the evacuation ports 24 can be a plurality of spaced apart circular holes formed through the upper wall 14, or other appropriate shapes. Whatever shape the evacuation ports 24 have, it is desirable for the ports 24 to be disposed directly underneath the braze preform 28.

Figure 4:
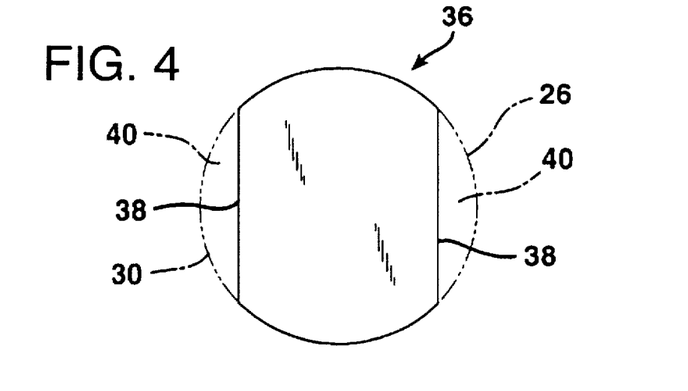
FIG. 4 is a top view of a plate-shaped braze preform according to the present invention.

Referring to FIG. 4, an alternative embodiment of a braze preform 28, according to the present invention, is a plate-shaped preform 36 in the form of a disk of uniform thickness with two opposite sides removed to form opposing parallel side edges 38. With the plate-shaped preform 36, the receptacle 26 can have a circular opening with a diameter slightly larger than the length of the preform 36 so that the preform 36 can be wedged within this circular receptacle 26 and yet remain a desired distance above the evacuation ports 24. Because of its opposing straight side edges 38, two gaps 40 will be formed one on either side of the plate-shaped preform 36 between the edges 38 and the wall 30 (shown in Phantom) defining the opening of the circular receptacle 26. Satisfactory results can be obtained with a plate-shaped preform 36 having a length of about 0.875 inches (2.22 cm), a width between the parallel side edges 38 in the range of about 0.625 inches to about 0.750 inches (1.59 cm to 1.91 cm), and a uniform thickness of about 0.060 inches (0.152 cm).

Figure 5A:
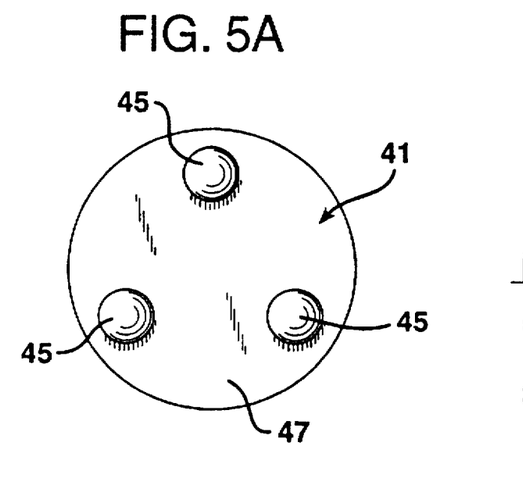
FIG. 5A is a bottom view of a circular disk-shaped braze preform according to the present invention, with a plurality of stand-off protuberances formed thereon.
Figure 5B:
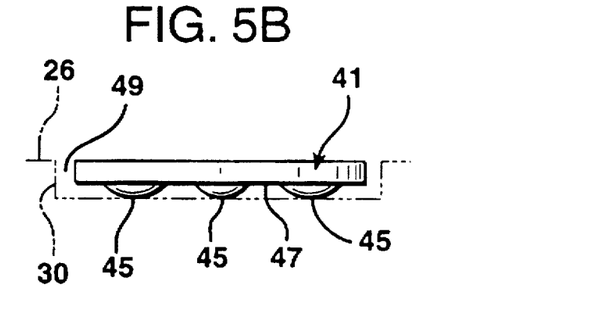
FIG. 5B is a side view of the braze preform of FIG. 5A.

Referring to FIGS. 5A and 5B, an alternative embodiment of the present braze preform 28 is a disk-shaped preform 41 having three or more stand-off protuberances or legs 45 equally spaced circumferentially around and extending down from the bottom surface 47 of the preform 41. It is desirable for the protuberances 45 to be an integrally formed part of the preform 41. The preform 41 is particularly suited for use in a circular receptacle 26 having straight vertical walls 30 (shown in Phantom in FIG. 5B). The legs 45 maintain the body of the preform 41 a desired distance above the bottom of the receptacle 26. In this way, a path for the evacuation of the interior space 20 is provided through the evacuation ports 24, underneath the preform 42 and out through a circular gap 49 between the upper circumferential edge of the preform 41 and the upper edge of the receptacle 26.

Figure 6A:
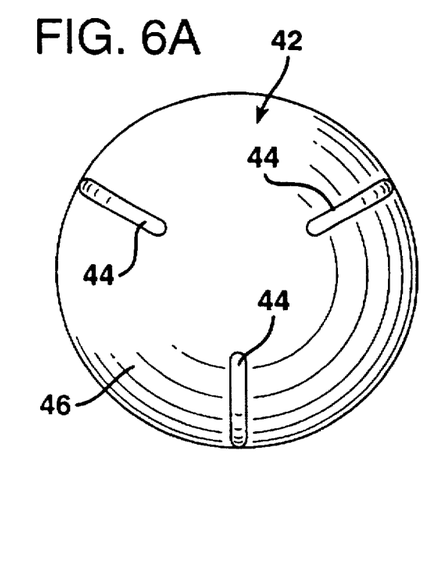
FIG. 6A is a bottom view of a spherical segment shaped braze preform according to the present invention, with a plurality of stand-off protuberances formed thereon.
Figure 6B:
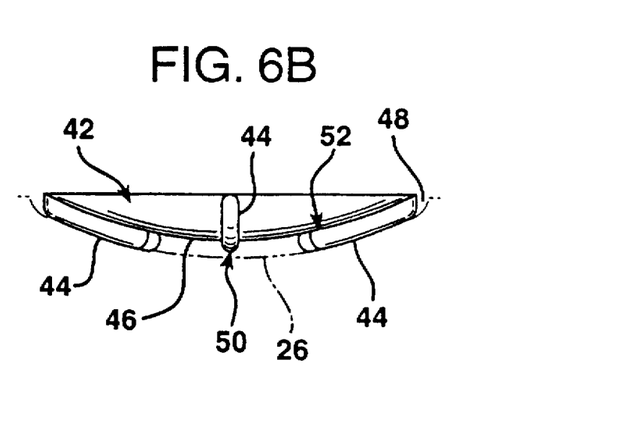
FIG. 6B is a side view of the braze preform of FIG. 6A.

Referring to FIGS. 6A and 6B, another embodiment of the present braze preform 28 is a spherical segment shaped preform 42 having three or more stand-off protuberances or legs 44 equally spaced circumferentially around and extending down from its convex shaped bottom surface 46. The spherical segment shaped preform 42 is particularly suited for use in a dimple-shaped receptacle 26 (shown in Phantom in FIG. 6B) having a simple spherical segment shape. The legs 44 maintain the body of the preform 42 a desired distance above the bottom of the receptacle 26. In this way, a path for the evacuation of the interior space 20 is provided through the evacuation ports, underneath the preform 42 and out through a ring-shaped gap 48 between the upper circumferential edge of the preform 42 and the upper edge of the receptacle 26. Satisfactory results can be obtained with a preform 42 having legs 44 that are 0.31 inches (0.79 cm) long, about 0.06 inches (0.15 cm) high and thick, and having a radius along its lower edge (shown by reference arrow 50) of about 1.25 inches (3.175 cm). The body of this exemplary preform 42 has a diameter of about 1.125 inches (2.857 cm), a maximum thickness of about 0.141 inches (0.358 cm), and a convex radius of curvature (shown by reference arrow 52) of about 1.19 inches (3.02 cm).

Figure 7:
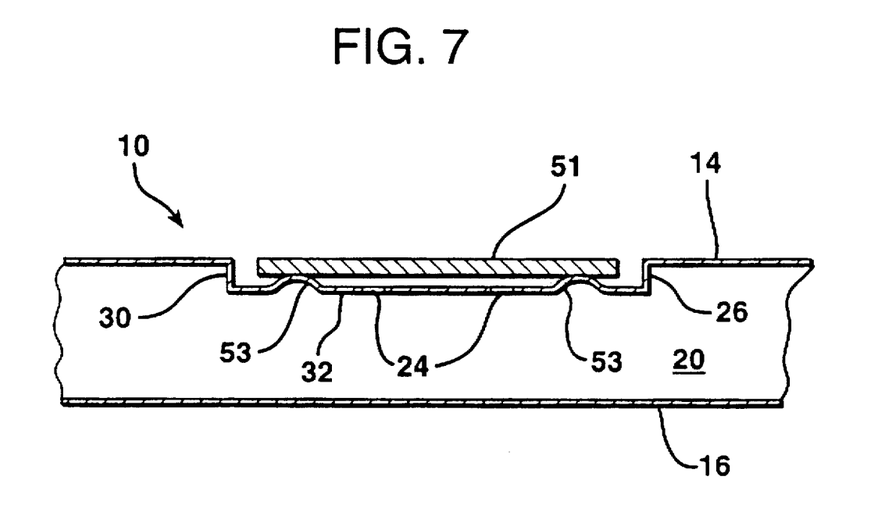
FIG. 7 is a sectional side view of a plate-shaped or disk-shaped braze preform, according to the present invention, located in a receptacle having a plurality of projections formed therein.
Figure 8:
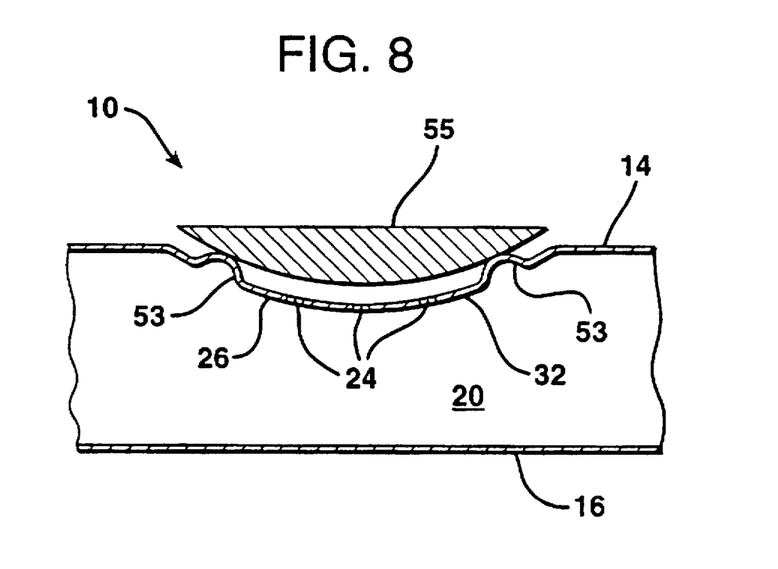
FIG. 8 is a sectional side view of a spherical segment shaped braze preform, according to the present invention, located in a receptacle having a plurality of projections formed therein.

Referring to FIG. 7, an alternative embodiment of the vessel 10 of FIGS. 1–3 includes a plate- or disk-shaped preform 51 of uniform thickness seated on a plurality of upwardly extending projections 53 formed on the bottom of a receptacle 26 having straight vertical walls 30. Referring to FIG. 8, a modification of the vessel 10 of FIG. 7 includes a spherical segment shaped preform 55 seated on a plurality of upwardly extending projections 53 formed on the spherical segment shaped bottom 32 of a dimple shaped receptacle 26. In either of these embodiments of the vessel 10, the projections 53 locate the preform 51 a desired distance above the bottom 32 of the receptacle 26 and the evacuation ports 24 to enable the interior space 20 to be evacuated therebetween. The projections 53 can be formed during the forming of the receptacle 26 using conventional sheet or foil metal forming techniques. The use of projections 53 in the receptacle 26, instead of stand-off protuberances on the preform 28, can be particularly desirable when the preform 28 is made from relatively soft (i.e., lower hardness) brazing alloys (e.g., copper and silver bearing alloys).

Figure 9:
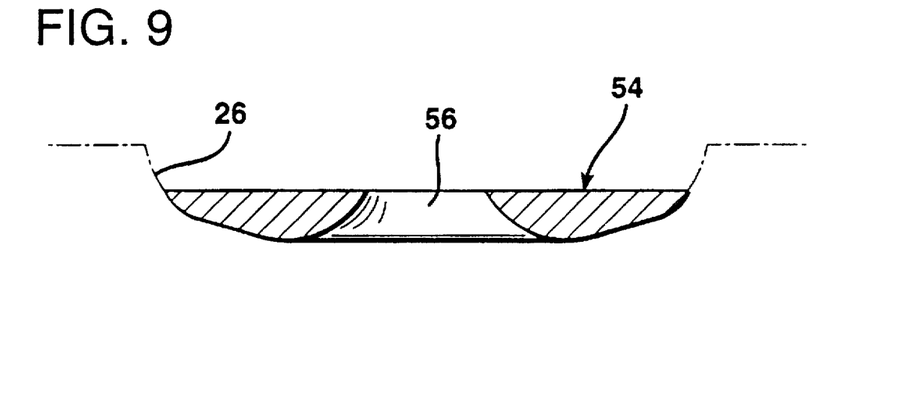
FIG. 9 is a sectional side view along a center line of a split doughnut shaped braze preform, according to the present invention.

Referring to FIG. 9, an alternative embodiment of the present preform 28 is a hemi-toroidal (split donut) shaped preform 54 which can fit snugly against the bottom of the receptacle 26 (shown in Phantom). The preform 54 has a central donut hole opening 56 which provides the path for evacuation of the interior space 20 through one or more evacuation ports 24 located within the periphery of the opening 56. Although the parts 24 are not disposed directly underneath the preform 28, satisfactory results may still be obtained. A hemi-toroidal shaped preform appears to require greater amounts of heat to melt, however, because it tends to need to be thicker to include the required amount of braze material. Satisfactory results can be obtained with a preform 54 having a thickness of about 0.111 inches (0.282 cm), an outside diameter of about 1.094 inches (2.779 cm), and an inside diameter of the hole 56 of about 0.25 inches (0.635 cm).

Figure 11:
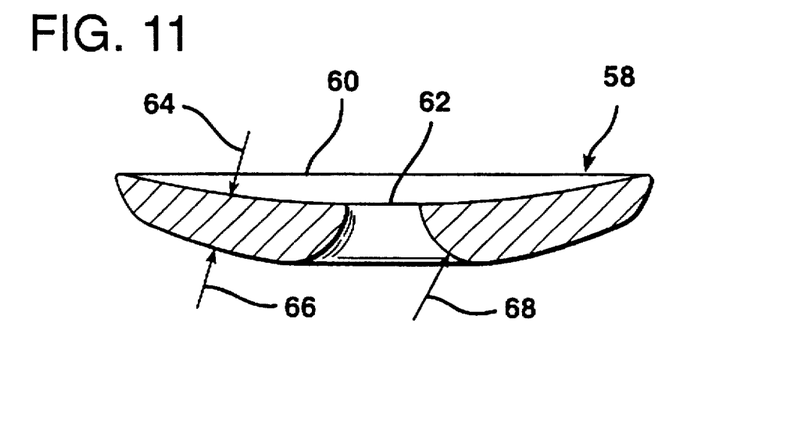
FIG. 11 is a sectional side view along a center line of a deflected split doughnut shaped braze preform, according to the present invention.

Referring to FIG. 11, a further alternative embodiment of the present braze preform 28 is a split donut shaped preform 58 which has a deflected appearance. That is, the preform 58 has an outer circular edge 60 that is higher than its inside hole edge 62. Satisfactory results can be obtained with a deflected preform 58 having an overall thickness of about 0.192 inches (0.487 cm), a deflected distance of about 0.067 inches (0.170 cm) between the outer edge 60 and the inside hole edge 62, a concave radius of curvature of about 2.5 inches (6.35 cm) for the deflection at reference arrow 64, a convex radius of curvature of 1.25 inches (3.175 cm) at reference arrow 66, a radius of curvature of about 0.125 inches (0.317 cm) at reference arrow 68, an outside diameter for outer edge 60 of about 1.125 inches (2.857 cm), and an inside diameter for the hole 62 of about 0.188 inches (0.477 cm).

It is desirable for the present braze preform 28 to be manufactured by sintering a sufficient quantity of binderless brazing particles by a supersolidus liquid phase sintering (SLPS) operation. Unlike traditional press-and-sinter methods, which can also be used to manufacture the present braze preforms 28, densification of the brazing particles in the SLPS operation occurs during the sintering cycle. In addition, pre-alloyed powders or particles of brazing material are sintered between their liquidus and solidus temperatures. While alternate methods of manufacturing the present sintered braze preforms 28 are possible, the best results have been obtained with gravity molding in a vacuum furnace using industry standard SLPS practices. In gravity molding, the molding cavity is open faced and the particles to be sintered are simply poured into the cavity. The force of gravity is used to keep the particles in the cavity.

In one exemplary SLPS process for manufacturing the present braze preforms 28, a gravity-type mold cavity is filled with a binderless nickel-chrome or primarily nickel-bearing brazing alloy powder. Satisfactory results have been obtained using a powder of nickel-based brazing alloy BNi-7 per American Welding Society AWS A5.8. The brazing alloy power BNi-6 may also be used. The BNi-7 brazing alloy powder has the following composition: Cr 14.50%; B 0.01%; Si 0.03%; Fe 0.04%; C 0.03%; P 10.43%; S 0.004%; Co 0.08%; Al<0.02%; Ti<0.02%; Mn<0.02%; Zr<0.02%; Se<0.005%; others<0.50%; and Ni the remainder. The BNi-6 brazing alloy powder is similar in composition to the BNi-7 but lacks chromium (Cr). It is desirable for the gravity-type mold to be made of alumina ($Al_2O_3$). The gravity-type mold may also be made of graphite, silicon carbide, boron nitride, or any other suitable material exhibiting high temperature strength, dimensional stability and minimal reactivity with the brazing powder. The mold cavity may even be coated with a suitable material to prevent the brazing material and the mold material from reacting. Once any excess brazing powder is scraped off, the brazing powder can be sintered by placing the mold in a continuous belt furnace purged with a suitable reducing or inert atmosphere of, for example, a hydrogen or argon gas, or a vacuum furnace. Depending upon the composition of the particular brazing alloy and the dwell time in the furnace, the sintering temperature is typically in the range of from about 1000° F. to about 1625° F. (538° C. to about 885° C.). For nickel based brazing alloys, like BNi-7 and BNi-6, the sintering temperature is typically in the range of from about 1550° F. to about 1625° F. (843° C. to about 885° C.). For the softer copper or silver based brazing alloys, the sintering temperature can be as low as about 1000° F. (538° C.).

It is desirable for more than one mold to be made at a time, and thus for each mold cavity or pocket to be formed in an individual gravity mold tile, where a plurality of these mold tiles can be stacked or otherwise mounted one on top of the other and adjacent to each other in the sintering furnace. Alternatively, a plurality of pockets or cavities may be formed, such as by machining, in a single gravity mold, on an upper surface or both its upper and lower surfaces. In order to consistently seal the interior space 20 of an evacuated vessel 10, it is desirable for the braze preforms 28, and therefore each mold cavity, to be very uniform in size and shape. Even so, braze preforms 28 of numerous shapes, sizes and thicknesses can be used to obtain satisfactory results.

Figure 10:
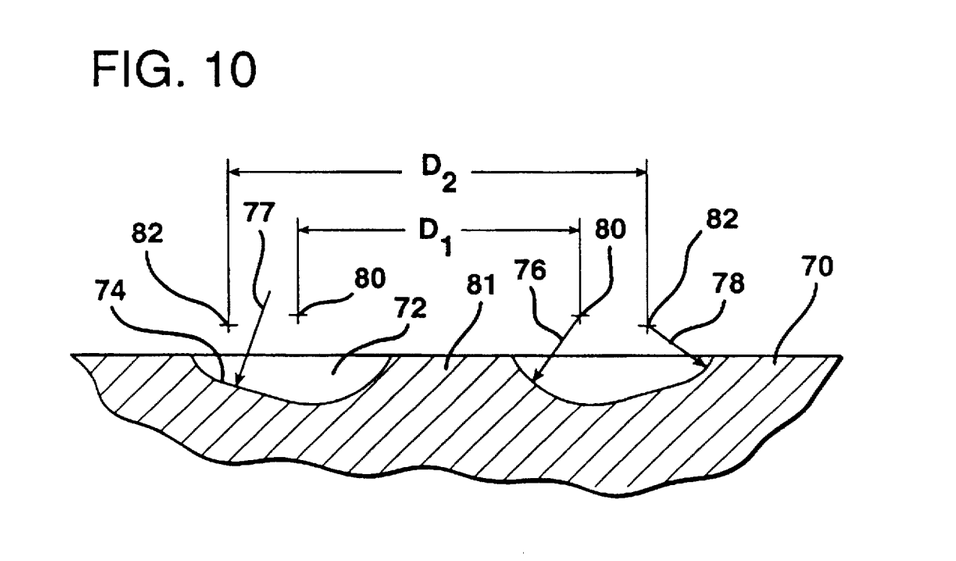
FIG. 10 is a sectional side view along a center line of a gravity mold cavity for molding the braze preform of FIG. 9.

Referring to FIG. 10, a gravity mold 70 for use in the supersolidus liquid-phase sintering (SLPS) of the exemplary split doughnut shaped preform 54, described above, includes a split doughnut shaped cavity 72 preferably configured such that the preform 54 tends actually to back out of the cavity 72 upon cooling after the sintering operation, which it is believed is at least partially attributable to contraction of the preform 28, as it cools, about a sloped central post portion 81 of the mold 70. An exemplary cavity 72 is about 0.111 inches (0.282 cm) deep, has an outside diameter of about 1.09385 inches (2.77838 cm) and an inside diameter of about 0.25000 inches (0.63500 cm). The cavity 72 has a bottom surface 74 with three concave radii of curvature as evidenced by reference arrows 76-78. In this exemplary cavity 72, the radius of curvature at 76 is about 0.1875 inches (0.4763 cm), at 77 is about 1.25 inches (3.175 cm) and at 78 is about 0.125 inches (0.3175 cm). The radius of curvature 76 has a point of origin 80 defined by a diameter $D_1$ of 0.59238 inches (1.5046 cm) at a distance of 0.076 inches (0.193 cm) above the surface of the mold cavity 72. The radius of curvature 78 has a point of origin 82 defined by a diameter $D_2$ of about 0.87500 (2.2225 cm) and is a distance of about 0.060 inches (0.152 cm) above the top of the cavity 72.

When particles of softer brazing alloys (e.g., copper and silver bearing alloys) are used, braze preforms 28, according to the present invention, can be manufactured by injecting the softer brazing particles into a pill-type press and consolidating the particles under pressures of up to about 5,000 to about 10,000 psi (259 m of Hg to 517 m of Hg) until the loaded brazing material assumes the shape of the mold cavity. If desired, heat can be applied to aid in the bonding (i.e., diffusion) between particles. The resulting preform typically exhibits little sintering and does not exhibit the degree of strength usually desired. From this "green" state, the preform is sintered to obtain the strength and density desired by, for example, sintering the "green" preform in a belt furnace or a vacuum furnace. If a belt furnace is used, it is usually important for the preform to be kept in a protective atmosphere of, for example, argon, hydrogen or some other suitably inert or reducing gas.

Braze preforms 28 having a maximum thickness as little as about 0.060 inches (0.152 cm) and weighing as little as about 2 grams can be routinely sintered, because of the increased density and strength imparted to the preform 28 by the sintering process. It is desirable for the present braze preforms 28 to range in thickness from about 0.060 inches to about 0.100 inches (0.152 cm to 0.254 cm). It is believed that braze preforms 28 as thin as 0.030 inches (0.076 cm), and possibly thinner, are possible. In addition, while it is desirable for the present braze preforms 28 to range in weight from about 2.5 grams to about 3.0 grams, preform weights as low as 0.5 grams are believed possible. Thinner and lighter preforms require less energy and dwell time at temperature to melt and can also be less expensive to manufacture.

The sintering temperature and the time that temperature is maintained can determine the density of the resulting braze preform. Another factor that can affect the density of the resulting preform 28 is the size and shape of the brazing particles used. For example, higher densities can be obtained when a brazing powder of two or more different size particles are used, or if smaller particles are used compared to larger particles. It is desirable for the present braze preform 28 to have a density in the range of from about 65% to about 100% (theoretical density). It is more desired for the present sintered braze preforms 28 to have a theoretical density in the range of from about 80% to about 95%. Binderless braze preforms 28 having a theoretical density of about 90% have exhibited more uniform thermal conductivity and melting compared to preforms approaching 100% theoretical density. Binderless braze preforms 28 having a theoretical density of about 90% tend to exhibit little if any movement or change in shape during heat up. Once the braze preform has reached melt temperature, actual melt and wet-out of the preform against the metals of the evacuation port occurs reliably and quickly.

Many properties of the preform can be effected by its density. While lower density preforms tend to exhibit mechanical weakness and a less robust nature, higher density preforms are more likely to exhibit bending or warping during the sealing of an evacuated vessel 10, especially when heated rapidly to melt during the sealing operation. At the same time, higher density preforms 28 may be subsequently reworked at lower temperatures into yet other shapes (thinner disks, wavy disks, etc.). In addition, rapid evacuation and heating rates used during the manufacturing of a vacuum insulation vessel 10 can highly stress the preform. These stresses can arise from differential heating of the preform and venting of air or other gases from the sintered powder's interstitial spaces. Therefore, the preforms that are denser, with tightly fused powder particles, are less likely to exhibit eruptions caused by these stresses. Another advantage of using a sintered braze preform, compared to a preform made of, for example, solid wrought brazing material, is that using particles of brazing material enables the various components of the brazing alloy to be more uniformly distributed throughout the preform. That is, particles of the various components can be blended into a homogeneous mixture, regardless of the size or shape of the preform 28.

When the SLPS cycle is complete, at least some of the binderless sintered braze preforms disclosed herein can be removed by simply inverting the gravity mold. The present sintered braze preforms densify during sintering and tend to contract slightly more than the mold cavity upon cooling, thereby facilitating their removal. It is desirable for the gravity mold to be designed so that the preform does not mechanically interlock with some feature of the mold cavity when the preform contracts upon cooling. While sintered braze preforms made from binderless brazing powder tend to be easily removed from their gravity molds, sintered braze preforms molded using a braze paste, of a binder and brazing powder, tend to be more difficult to remove and the molds tend to require periodic cleaning. Using binderless braze powder in the gravity molding process is typically very economical because the molds are generally non-stick, low maintenance and may be reused many times before having to be replaced.

To melt the perform 28, a localized infrared heat source is directed at the preform 28 and the evacuation port. Thus power levels for the heaters used to melt the present preforms 28 typically range from about 500 watts to about 1000 watts (28.4 to 56.9 BTU's per min.). The present preforms conduct heat more efficiently through their mass because of their relatively high density of brazing particles. This greater thermal conductivity enables the present preforms 28 to heat evenly, with less tendency for the surface facing the heating element to over-heat and outgas critical constituents of the braze alloy powder. Accordingly, higher energy levels, for shorter periods of time, can be used to melt the present sintered braze preforms 28 during the sealing of an evacuated vessel 10, and a simple timed heating cycle may be used instead of a complex temperature feedback cycle.

In one embodiment of the process for manufacturing a vacuum insulation vessel 10 having a binderless braze preform 28 in a receptacle 26, according to the principles of the present invention, the jacket 12 (especially when it contains an insulation medium 22) is preheated to about 600° F. (315° C.) in an oven at atmospheric pressure. Preheating the unevacuated vessel 10 can reduce the vessel's internal air density (by up to one-half) and helps to energize the air and other volatiles within the interior space 20. The gas composition in the prebake oven can be dry air or an oxygen-free gas mixture as necessary to prevent excessive oxidation of the braze preform 28 or the metal jacket 12, and/or chrome depletion. For example, using an atmospheric preheat of about 30 to about 40 minutes at 600° F. (315° C.) followed by vacuum chamber evacuation, a vacuum of 10 microns of mercury can be obtained within about 25 minutes. Without the preheat step (i.e., using a one-step evacuation technique), it is expected that a vacuum of about 100 microns of Hg would take approximately 60 minutes to obtain. Thus, such a preheating step can precondition the vessel 10 for more efficient evacuation of its interior space 20. Promptly after the preheating step, the vessel 10 is placed in a vacuum chamber while the vessel 10 is still hot. It is desirable for this transfer to occur within about five minutes or less of the preheating step. The desired preheat period for a particular vessel configuration can be determined by simple trial and error experimentation.

After the interior space 20 of the vessel 10 is sufficiently evacuated, the preform 28 is locally heated until the preform is molten, for example, by using a resistive heater disposed within the vacuum chamber. The localized heating is then discontinued and the preform is allowed to solidify and cool. During this cooling down step, the vessel tends to function as a heat sink to aid in the rapid solidification and cooling of the molten preform 28. To facilitate the solidification and cooling of the molten preform 28, it is desirable to backfill the vacuum chamber with an inert gas such as, for example, nitrogen gas. It may also be desirable to backfill the vacuum chamber with an inert gas, like nitrogen, prior to the melting of the braze preform 28. There are a number of advantages to using a sintered preform of particulate brazing material, according to the principals of the present invention, instead of a brazing paste as taught in the prior art. The present sintered braze preform can be made to exhibit a more consistent shape geometry and weight from piece to piece. This consistency in the preform has been found to allow the heaters used to melt the preform to be configured and function substantially the same, thereby providing for consistent braze sealing of evacuated vacuum insulation vessels. The high predictably of this operation also allows a simplified heating cycle to be used. Instead of employing a more complex temperature feedback scheme, a simple timed heating cycle can be used.

Typical braze paste is formulated for a protracted schedule of evacuating the vessel, heating-up and melting the braze material, and solidifying and cooling the braze material. Such a protracted schedule can last several hours. If the braze paste is applied directly to the metal jacket of the vessel and is subjected to such a protracted schedule, it can perform satisfactorily. However, such protracted schedules are relatively inefficient and costly. When the cycle time is shortened, the braze paste is subjected to internal stresses that can cause rupture or explosions of the braze paste material during the sealing process. For some vacuum insulation vessels, in particular those containing an insulation medium such as glass fibers, shorter cycles are desired. Subjecting insulation containing vessels to a protracted schedule can adversely affect the performance of the finished vessel. Protracted heating during the sealing step, in particular, can cause severe melting or other degradation of the insulation medium located in the brazing area.

Because the present sintered braze preforms can be substantially free, if not devoid, of volatile materials (i.e. either binderless or a substantial amount of binder being burned off during sintering), outgassing of such volatile compounds from the preform can be eliminated or significantly reduced during the manufacturing of the vessel 10. Such outgassing can otherwise rupture a preform. Ruptured preforms not only result in failed vacuum insulation vessels, but can also lead to contamination of the brazing heaters. Contaminated heaters have altered resistivity and radiant emission characteristics when compared to clean heaters. Therefore, ruptured braze preforms also have a detrimental effect on future sealing operations. With the elimination or significant reduction of such outgassing, the heater elements as well as the entire vacuum system can stay cleaner for longer periods of time. In addition, a consequence of maintaining a cleaner vacuum system, there is a lower incidence of electrical arc-over. Eliminating or significantly reducing outgassing also contributes to an improved braze seal by eliminating or significantly reducing contamination in the molten braze puddle. Additional benefits include a reduction in required maintenance for the overall vacuum system (e.g. vacuum pumps, chamber, racks and heater hardware).

The present sintered braze preform is relatively stronger and more durable, both at room and elevated temperatures. Some of the present preforms can be dropped from several feet without being damaged. Such tolerance to damage can enable the present preforms to survive the rigors of shipping and handling and, thereby, allow the preforms to be manufactured at a separate location (such as by a supplier) and packaged in bulk. The present preforms can exhibit high temperature strengths which allow for rapid pump down rates at preform temperatures approaching 600° F. (315° C.) with less incidence of eruption from rapid venting of internally trapped air or other gases. This is a different mechanism from eruptions due to the volatilization of organics or other components of a braze paste. The elimination of eruptions in the braze preform prevents contamination of the heaters used to melt the preforms. Consequently, heater emissivity, resistivity and effective heater output can remain unchanged over longer periods of time. This, in turn, can reduce maintenance expense, down time and the variability involved in sealing large numbers of vacuum insulation vessels 10.

The present sintered braze preforms can enable the use of an aggressive evacuation and heating cycle. The present preforms, in particular the binderless preforms, are less likely to erupt or otherwise interfere with the evacuation and heat sealing process. They tend to stay in place and behave in a very predictable manner.

By sintering the particles of the brazing material, a robust braze preform can be formed. A robust preform permits significant weight and cost savings to be realized. The present preforms can be made thin and light, thereby allowing shorter sealing cycles to be used, due to the smaller mass to be melted. Since the implementation of sintered braze preforms according to the principals of the present invention, vacuum insulation panel yields can be increased from approximately 50% to as high as 95%.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

We claim:

1. A method for manufacturing a vacuum insulation vessel comprising the steps of:

forming a metal jacket defining an interior space to be evacuated and having an evacuation port providing an opening to the interior space, said step of forming the jacket including forming a receptacle in a portion of the jacket with the evacuation port being formed in the receptacle;

providing a preform of sintered brazing material;

disposing the preform of sintered brazing material within the receptacle adjacent to the evacuation port;

evacuating the interior space of the jacket, at least one of the receptacle and the preform is operatively adapted so as to allow the evacuation of the interior space through the evacuation port to progress substantially unimpeded; and melting and then allowing solidification of the preform so as to seal the evacuation port and maintain a vacuum in the interior space.

2. The method as recited in claim 1, wherein said step of forming the jacket includes the step of providing an insulation medium in the interior space.

3. The method as recited in claim 1, wherein said step of forming the jacket includes the steps of forming a receptacle in a portion of the jacket and forming the evacuation port in the receptacle, and said step of locating the preform includes disposing the preform in the receptacle.

4. The method as recited in claim 1, wherein said step of providing the preform includes providing a preform of brazing material formed by supersolidus liquid phase sintering.

5. The method as recited in claim 1, wherein said step of providing the preform includes providing a preform made by gravity molding and sintering binderless particles of a brazing alloy in a furnace.

6. The method as recited in claim 1, wherein said step of melting the preform includes applying a timed-cycle of heat to melt the preform.

7. The method as recited in claim 1, wherein said step of providing the preform includes providing a preform having at least one stand-off protuberance for maintaining the preform a sufficient distance above the evacuation port to provide a path for the evacuation of the interior space.

8. The method as recited in claim 1, wherein said step of forming the jacket includes forming the receptacle with at least one projection that maintains the preform a sufficient distance above the evacuation port to provide a path for the evacuation of the interior space.

9. The method as recited in claim 1, wherein said step of forming the jacket includes forming the receptacle with an opening having a first shape and said step of providing the preform includes providing a preform with an outer peripheral edge having a second shape, and said first shape and said second shape are sufficiently different to provide at least one gap therebetween which provides a path for the evacuation of the interior space through the evacuation port when the preform is disposed in the receptacle.

10. The method as recited in claim 1, wherein said step of providing the preform includes providing a thin preform having a thickness of at least about 0.030 inches (0.076 cm).

* * * * *